Nov. 17, 1936.  J. F. DUFFY  2,061,145

INSPECTION COVER

Filed Jan. 20, 1936

Inventor
James Francis Duffy
By Liverance and
Van Antwerp
Attorneys

Patented Nov. 17, 1936

2,061,145

UNITED STATES PATENT OFFICE 2,061,145

INSPECTION COVER

James Francis Duffy, Holland, Mich., assignor to Duffy Manufacturing Company, Holland, Mich., a corporation of Michigan Application January 20, 1936, Serial No. 60,005

4 Claims. (Cl. 220—24)

This invention relates to an inspection cover. The device of my invention is particularly useful in covering openings through which mechanisms or parts thereof may be inspected, it being desirable that the opening shall be completely closed and covered at all other times than when the inspection is occurring.

One place where my invention is particularly useful is on automobiles for the inspection of hydraulic braking apparatus, over which is a metal member and in which metal member an opening is provided so that the apparatus may be inspected. The opening is closed by the device of my invention which may be removed whenever inspection is desired, and which when in place, closes and in effect seals the opening, particularly against the passage of water, dirt, mud or the like which might splash from the road upwardly would pass through the opening if it was not suitably closed and sealed thereagainst.

The invention is also applicable in many other relations as a closure for an opening in a metal container, plate or the like, and is not to be considered as limited in use to the one specific use stated.

The invention is fully described in the following description and may be understood therefrom, taken in connection with the accompanying drawing, in which, Fig. 1 is an elevation of the inspection cover of my invention shown in place in a metal member having an opening therethrough, which member is shown fragmentarily in section.

Like reference characters refer to like parts in the different figures of the drawing.

Figure 1:
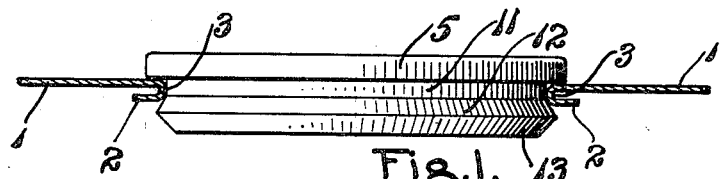
Figure 2:
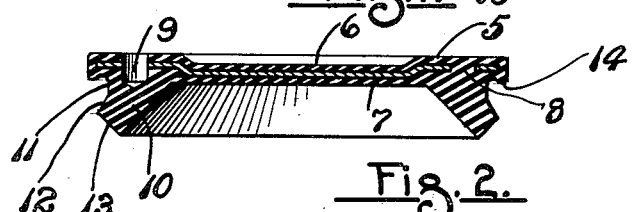
Fig. 2 is a section through the cover substantially on the plane of the broken line 2—2 of Fig. 3.
Figure 3:
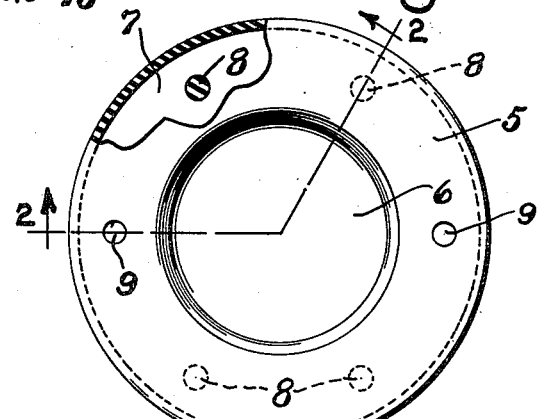
Fig. 3 is a plan view of the cover with a part thereof broken away to illustrate the interior construction.
Figure 4:
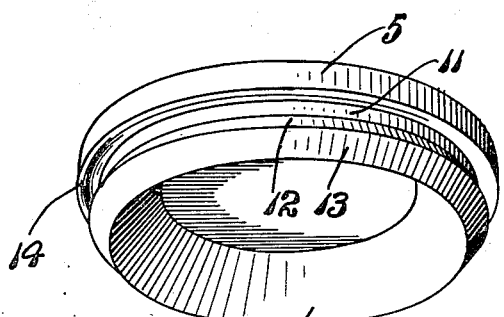
Fig. 4 is a perspective view of the inspection cover of my invention.

The plate 1, shown in Fig. 1, is of sheet metal and at an opening therein, at which the cover of my invention is to be applied, the metal is turned back upon itself to make an under annular flange 2 connected with the body of the plate 1 by a U-shaped bend 3. The device of my invention which is to be applied at the opening is made chiefly of rubber and as shown is made of a circular outline to conform to a circular opening. Of course, the opening may be other than circular, in which case the inspection cover will be of a form to correspond. It comprises an upper disk portion 5 which preferably though not necessarily is depressed at its central portion as indicated at 6. Within this disk of rubber a plate 7 of sheet metal is molded and which may be centrally depressed to conform with the depression 6 in the upper side of the disk 5. The periphery of the plate is within the peripheral edges of the upper disk portion 5 of the inspection cover. A plurality of holes located in spaced apart relation to each other and adjacent the edges of the disk are provided so that through part of said holes the rubber, when it is molded, may pass as indicated at 8, while other holes are filled with suitable plugs whereby after the device has been molded and vulcanized and the plugs removed, openings 9 are left from the upper side of the disk 5 downwardly through the plate 7 and for a short distance therebelow, as shown in Fig. 2. Such holes or openings 9 are of utility in removing the devices of my invention from the vulcanizing mold and from the openings they cover in use. The rubber is vulcanized to the plate 7 by any suitable process of vulcanization such as is well known in the art.

At the underside of the disk 5, an annular downwardly and outwardly extending flange or lip 10 is made integral with and of the same material as the disk 5. This flange is located within the peripheral edges of the upper disk portion 5 whereby there is provided an annular vertical surface 11 which is continued in a downwardly and outwardly inclined annular surface 12 at the outer side of the flange 10. The terminal edge portions of the flange 10, indicated at 13, are downwardly and inwardly inclined from the lower edges of the downwardly and outwardly inclined annular face 12 previously described.

The projecting edges of the disk portion 5 which extend beyond the flange portion 10, at the underside thereof, are formed with an ogee curve so as to provide a rounded downwardly extending annular lip 14 at the underside and at the periphery of the disk portion 5.

When this cover member is applied to the opening through the sheet metal plate 1, the inclined terminal portions 13 of the flange 10 ride upon the curved U-shaped bends 3 of the metal surrounding the opening, and rubber being flexible and yieldable, the flange 10 may be forced through the opening whereupon the annular downwardly and outwardly inclined surface 12 will bear against the lower side of the U-shaped bend 3 and tend to draw the cover in a downward direction, bringing the annular lip 14 against the upper surface of the plate 1, and compressing the same so as to provide an effective seal against the passage of water, dirt, dust or the like upwardly through the opening which is closed and covered by the cover of my invention.

The removal of the cover for the purpose of inspection of mechanism underneath, for example, parts of the hydraulic brake mechanism applied to an automobile, is simple, requiring only the insertion of a suitable tool into either of the openings 9 and applying sufficient force to cause the flange 10 to yield and pass upwardly through the opening. The plate 7 within the upper disk portion of the cover imparts strength and rigidity to the device and makes the same of longer life in service. The device is readily manufactured, being suitably molded from a rubber composition and vulcanized in the usual manner. The lip at 14 by reason of the ogee curved structure described will be of a softer more compressible nature than some other parts of the cover member so that its sealing effect is enhanced.

The construction described has proved very practical and useful and is now being manufactured and sold in large quantities.

The invention is defined in the appended claims and is to be considered comprehensive of all forms of structure coming within their scope.

I claim:

1. In combination, a supporting member having an opening therethrough, the edges of said opening being of a curved form and a cover member for said opening comprising, an upper section of greater area than the area of said opening and having its edge portions extending beyond the sides of the opening, and an annular flange integral with and extending downwardly from said upper section, said flange having an annular groove around the same immediately below said upper section into which the edge portions of the opening in said supporting member extend, said flange below the groove having outer surfaces first extending downwardly and outwardly and then downwardly and inwardly, the material of said cover being of an elastic and compressible nature, said upper section having an annular downwardly extending lip around its peripheral portions and at its lower side to bear against the upper side of the supporting member around the opening therein, and being compressed against said supporting member by the engagement of the supporting member at its undersides around the opening with the downwardly and outwardly extending annular surface of said flange.

2. An article of the class described comprising, an upper substantially flat section and an annular downwardly and outwardly extending flange integral therewith, all of elastic material, the outer sides of said flange being disposed inwardly a short distance from the periphery of the flat section, the outer surface of the flange extending downwardly in a vertical direction for a short distance from the lower side of the plate section and then outwardly and downwardly at an angle to the vertical, and said flange having a terminal edge extending downwardly and inwardly at an angle to the vertical, a thin metal plate located in said upper section, the edges of which are disposed a short distance inwardly from the peripheral edges of said upper section, and the said plate having openings therethrough, through which integral portions of the elastic material pass.

3. An article of the class described comprising, an upper substantially flat section and an annular downwardly and outwardly extending flange integral therewith, all of elastic material, the outer sides of said flange being disposed inwardly a short distance from the periphery of the flat section, the outer surface of the flange extending downwardly in a vertical direction for a short distance from the lower side of the plate section and then outwardly and downwardly at an angle to the vertical, and said flange having a terminal edge extending downwardly and inwardly at an angle to the vertical and an annular depending lip located at the underside and peripheral edges of said upper section, said lip having an annular recess in the underside of said upper section between said lip and the outer vertical side of said flange.

4. An article of the class described comprising, an upper substantially flat section and an annular downwardly and outwardly extending flange integral therewith, all of elastic material, the outer sides of said flange being disposed inwardly a short distance from the periphery of the flat section, the outer surface of the flange extending downwardly in a vertical direction for a short distance from the lower side of the plate section and then outwardly and downwardly at an angle to the vertical, and a thin reinforcing plate located in said upper flat section, the edges of said plate being located a short distance inwardly from the peripheral edges of said upper section, said article having an opening extending into the said flat section and through the said reinforcing plate near its periphery.

JAMES FRANCIS DUFFY.